M. F. JONES.
MACHINIST'S SCALE.
APPLICATION FILED MAY 7, 1910.

979,768.

Patented Dec. 27, 1910.

Witnesses
A. M. Shannon.
A. M. Dow.

Inventor
Marion F. Jones

By Bartlett & Bartlett
Attorneys

UNITED STATES PATENT OFFICE.

MARION F. JONES, OF DETROIT, MICHIGAN.

MACHINIST'S SCALE.

979,768.   Specification of Letters Patent.   Patented Dec. 27, 1910.

Application filed May 7, 1910.   Serial No. 559,972.

*To all whom it may concern:*

Be it known that I, MARION F. JONES, a citizen of the United States of America, residing at Detroit, in the county of Wayne and State of Michigan, have invented certain new and useful Improvements in Machinists' Scales, of which the following is a specification, reference being had therein to the accompanying drawings.

This invention relates to a machinist's scale and its object is to provide a scale bar with a supporting member at one end thereof for supporting the end of one arm of an outside caliper in position against the end of the scale bar so that the distance between the ends of the arms of the caliper may be accurately read upon the scale without inconveniencing the operator in holding the end of the caliper arm accurately against the end of the bar.

Figure 1:
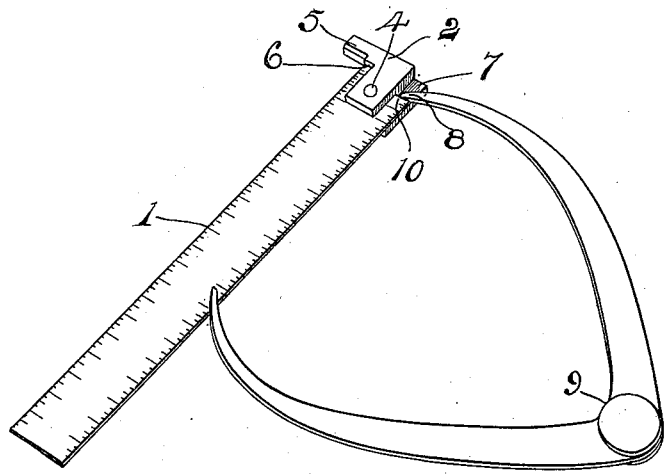
Figure 2:
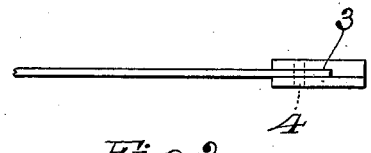
Figure 3:
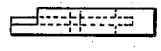

The invention further consists in certain other new and useful features in the construction and combination of parts all as hereinafter more fully described reference being had to the accompanying drawings in which, Figure 1 is a perspective view of a device embodying the invention and illustrating its use with calipers; Fig. 2 is an enlarged detail showing an edge elevation of the scale; and Fig. 3 is an end view of the same.

As shown in the drawing 1 represents a steel strip or bar having graduation marks along its edges, forming a scale as ordinarily constructed for machinists' use. A head 2 is provided with a slot 3 in one edge to receive the end of the scale bar and said head is secured in place upon the bar by a screw or rivet 4 extending through the head and bar. Projecting laterally from one side of the head at right angles to one edge of the bar, is an arm or hook 5 and one side of this arm abuts the end of the scale bar forming a shoulder 6 against which the end of one arm of inside calipers may be placed to facilitate the reading upon the scale of the distance between the ends of the arms. Projecting from the side of the head toward the opposite side of the scale is a flange 7 lying wholly at one side of the scale bar and forming a ledge for supporting the end 8 of one arm of outside calipers 9 with said end against the end 10 of the scale bar. The side of the head forms a wall extending at right angles to the flange and the meeting of this wall, the upper face of the flange or ledge, and the vertical end face of the scale bar, forms an angle or corner to receive the end of the arm of the calipers. The measuring by means of the outside calipers is thus facilitated by providing the ledge on the head for supporting the end of the caliper arm in engagement with the end of the scale bar so that the operator will not be obliged to hold said end of the arm in place against the end of the scale while he is reading the measurement. By forming the ledge upon the head which is also provided with a laterally extending arm or hook and with a shoulder for engaging the arm of an inside caliper, a scale is provided which may be used with both inside and outside calipers to get measurements quickly and accurately and a very simple and convenient tool for machinists' use is secured.

It is obvious that changes in the details of construction may be made without departing from the spirit of my invention and I do not wish to confine myself to any particular form or construction.

What I claim as my invention is:

1. The combination with a scale bar, of a head provided with an arm extending laterally therefrom at right angles to one edge of the bar and forming a shoulder at the end of the bar for the engagement of the end of one arm on an inside caliper, a flange on the other side of the head extending laterally therefrom toward the edge of the bar and projecting beyond the end of said bar to form a supporting ledge for supporting the end of one arm of outside calipers in contact with the end of the scale bar.

2. The combination with a scale bar having graduations reading from one end thereof, of a head formed with a slit to receive said end of said bar and provided with an arm projecting at right angles to one edge of the bar with one side of said arm abutting the end of the bar, and a flange on the opposite side of the head, the upper supporting surface of which flange extends in the plane of the under surface of the bar beyond the end of said bar to form a support for one arm of an outside caliper with said caliper arm in contact with the end of the bar.

In testimony whereof I affix my signature in presence of two witnesses.

MARION F. JONES.

Witnesses:
 LEWIS E. FLANDERS,
 OTTO F. BARTHEL.